US012686219B2

(12) United States Patent
Endo et al.

(10) Patent No.: US 12,686,219 B2
(45) Date of Patent: Jul. 21, 2026

(54) DEVICE, RECORDING DEVICE

(71) Applicant: SEIKO EPSON CORPORATION, Tokyo (JP)

(72) Inventors: Katsuyuki Endo, Matsumoto (JP); Yoshiyuki Okazawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 135 days.

(21) Appl. No.: 18/336,298

(22) Filed: Jun. 16, 2023

(65) Prior Publication Data

US 2023/0406015 A1 Dec. 21, 2023

(30) Foreign Application Priority Data

Jun. 20, 2022 (JP) ................................ 2022-098684

(51) Int. Cl.
*B41J 29/02* (2006.01)

(52) U.S. Cl.
CPC .................................... *B41J 29/02* (2013.01)

(58) Field of Classification Search
CPC . B41J 29/02; B41J 29/13; B41J 13/106; B41J 13/036; B41J 13/076
See application file for complete search history.

(56) References Cited

U.S. PATENT DOCUMENTS 6,030,133 A * 2/2000 Endo ....................... B41J 11/48 400/82
6,213,464 B1 4/2001 Inoue
6,474,883 B1 * 11/2002 Kawakami ........... B41J 11/0045 400/613
7,909,456 B2 3/2011 Suzuki et al.
2001/0017644 A1 8/2001 Cappello et al.
2005/0146591 A1 7/2005 Tanaka
2007/0236552 A1 10/2007 Suzuki et al.
2008/0211167 A1 9/2008 Kagami
(Continued)

FOREIGN PATENT DOCUMENTS

CN 101052090 A 10/2007
EP 1110742 6/2001
(Continued)

OTHER PUBLICATIONS

Yazawa, Hiroaki, Ink-Jet Recording Apparatus, Oct. 20, 2011, Japan, All Pages (Year: 2011).*
(Continued)

*Primary Examiner* — Ricardo I Magallanes
*Assistant Examiner* — Tracey M Mcmillion
(74) *Attorney, Agent, or Firm* — WORKMAN NYDEGGER

(57) ABSTRACT

A device includes a housing. The housing is capable of accommodating a recording unit. The recording unit includes a recording portion that performs recording on a medium, and a loading portion on which a medium is loaded after recording is performed on the medium by the recording portion. The housing includes a extraction portion that demarcates a extraction area from which a medium loaded on the loading portion is removable. The extraction area is an area from which a medium loaded on the loading portion is removable from downstream in a discharge direction in which the medium on which recording is performed by the recording portion is discharged.

20 Claims, 9 Drawing Sheets

(56) References Cited

U.S. PATENT DOCUMENTS

| | | | |
|---|---|---|---|
| 2019/0092047 A1 | 3/2019 | Otsuka et al. | |
| 2019/0384551 A1 | 12/2019 | Miyasaka | |
| 2020/0171812 A1* | 6/2020 | Samuelson | G07F 19/205 |
| 2021/0283918 A1* | 9/2021 | Takabayashi | B41J 29/12 |
| 2021/0291535 A1 | 9/2021 | Sugiura | |
| 2021/0300081 A1 | 9/2021 | Takahashi | |

FOREIGN PATENT DOCUMENTS

| | | | |
|---|---|---|---|
| JP | H02309472 | 12/1990 | |
| JP | H07154517 | 6/1995 | |
| JP | H10076709 | 3/1998 | |
| JP | H11301044 | 11/1999 | |
| JP | 2004025589 | 1/2004 | |
| JP | 2005205647 | 8/2005 | |
| JP | 2006239993 | 9/2006 | |
| JP | 2009166914 | 7/2009 | |
| JP | 2010017998 | 1/2010 | |
| JP | 2021-138469 A | 9/2021 | |
| JP | 2022001449 | 1/2022 | |
| KR | 2019013386 A * | 2/2019 | B41J 11/006 |

OTHER PUBLICATIONS

Takabayashi Kazunori, Recording Device, Sep. 24, 2021, Japan, All Pages (Year: 2021).*

* cited by examiner

DEVICE, RECORDING DEVICE

The present application is based on, and claims priority from JP Application Serial Number 2022-098684, filed Jun. 20, 2022, the disclosure of which is hereby incorporated by reference herein in its entirety.

BACKGROUND

1. Technical Field

The present disclosure relates to a device capable of accommodating a recording unit and a recording device that performs recording on a medium.

2. Related Art

For example, JP 2021-138469 A discloses a recording device including a recording unit that performs recording on a medium, a housing that accommodates the recording unit, and a extraction portion through which a medium after recording is removable from an outside of the housing. The extraction portion is provided outside the recording unit. The recording unit is configured to discharge a medium after recording outside the recording unit. Accordingly, the recording device is configured to drop a medium after recording from the recording unit to the extraction portion.

However, since such a recording device is configured such that a medium after recording drops from the recording unit to the extraction portion, there was a problem in an alignment property of the medium after recording. Therefore, it is desired to improve the alignment property of the medium after recording.

SUMMARY

A device that solves the above problem is a device configured to accommodate a recording unit including a recording portion for performing recording on a medium, and a loading portion on which a medium is loaded after recording is performed on the medium by the recording portion, the device including a housing configured to accommodate the recording unit, wherein the housing includes a extraction portion that demarcates a extraction area from which a medium loaded on the loading portion is removable, and the extraction area is an area from which a medium loaded on the loading portion is removable from downstream in a discharge direction in which a medium on which recording is performed by the recording portion is discharged.

DESCRIPTION OF EXEMPLARY EMBODIMENTS

First Embodiment

An embodiment of a recording device will be described below. In the following description, a direction intersecting (for example, orthogonal to) a vertical direction Z is referred to as a width direction X, and a direction intersecting the vertical direction Z and the width direction X is referred to as a front-rear direction Y. One side in the width direction X is referred to as a first width direction X1, and another side in the width direction X is referred to as a second width direction X2. One side in the front-rear direction Y is referred to as a front side Y1, and another side in the front-rear direction Y is referred to as a rear side Y2. An upper side in the vertical direction Z is referred to as an upper side Z1, and a lower side in the vertical direction Z is referred to as a lower side Z2.

Configuration of Recording Device 10

Figure 1:
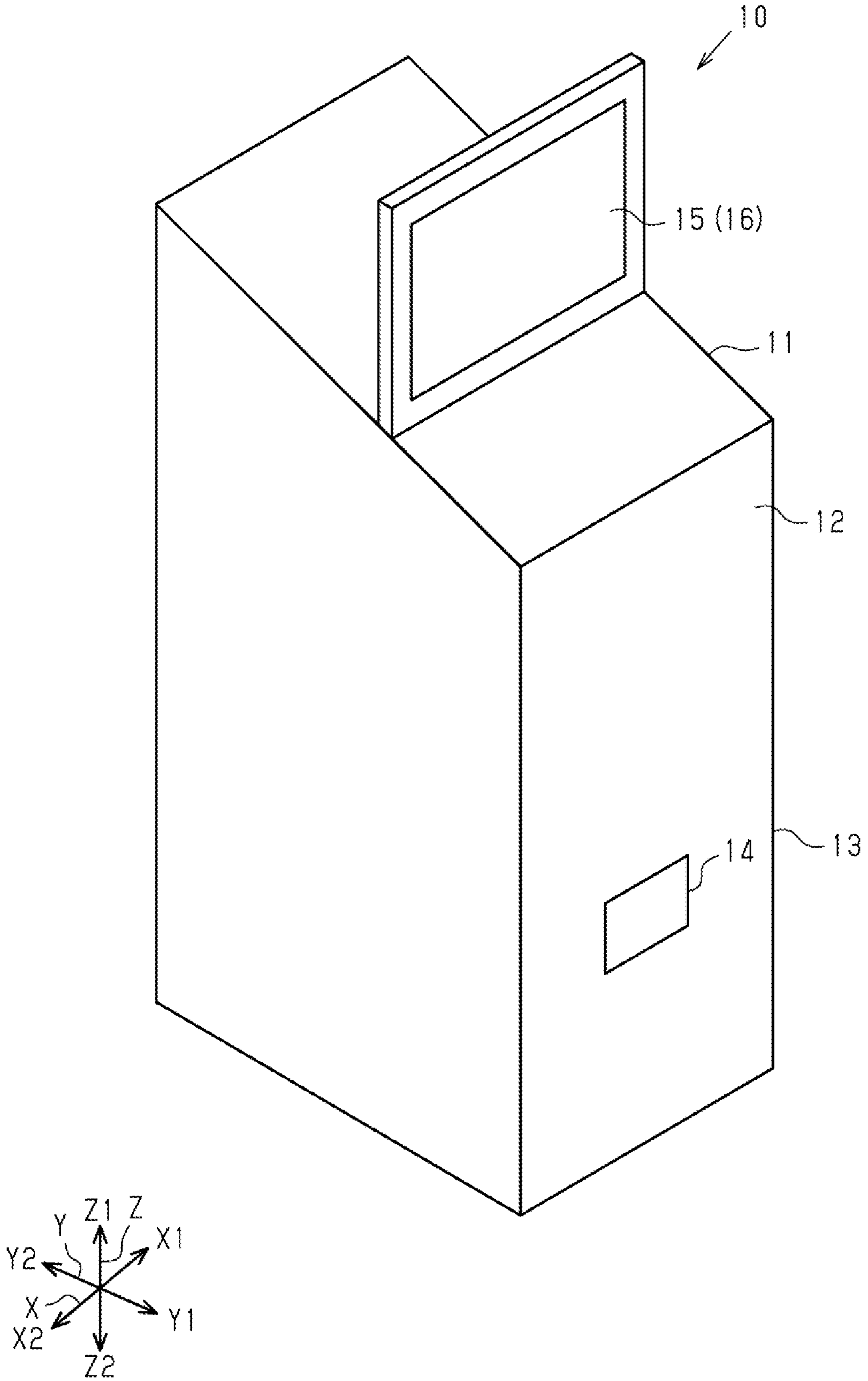
FIG. 1 is a perspective view illustrating a recording device.
Figure 2:
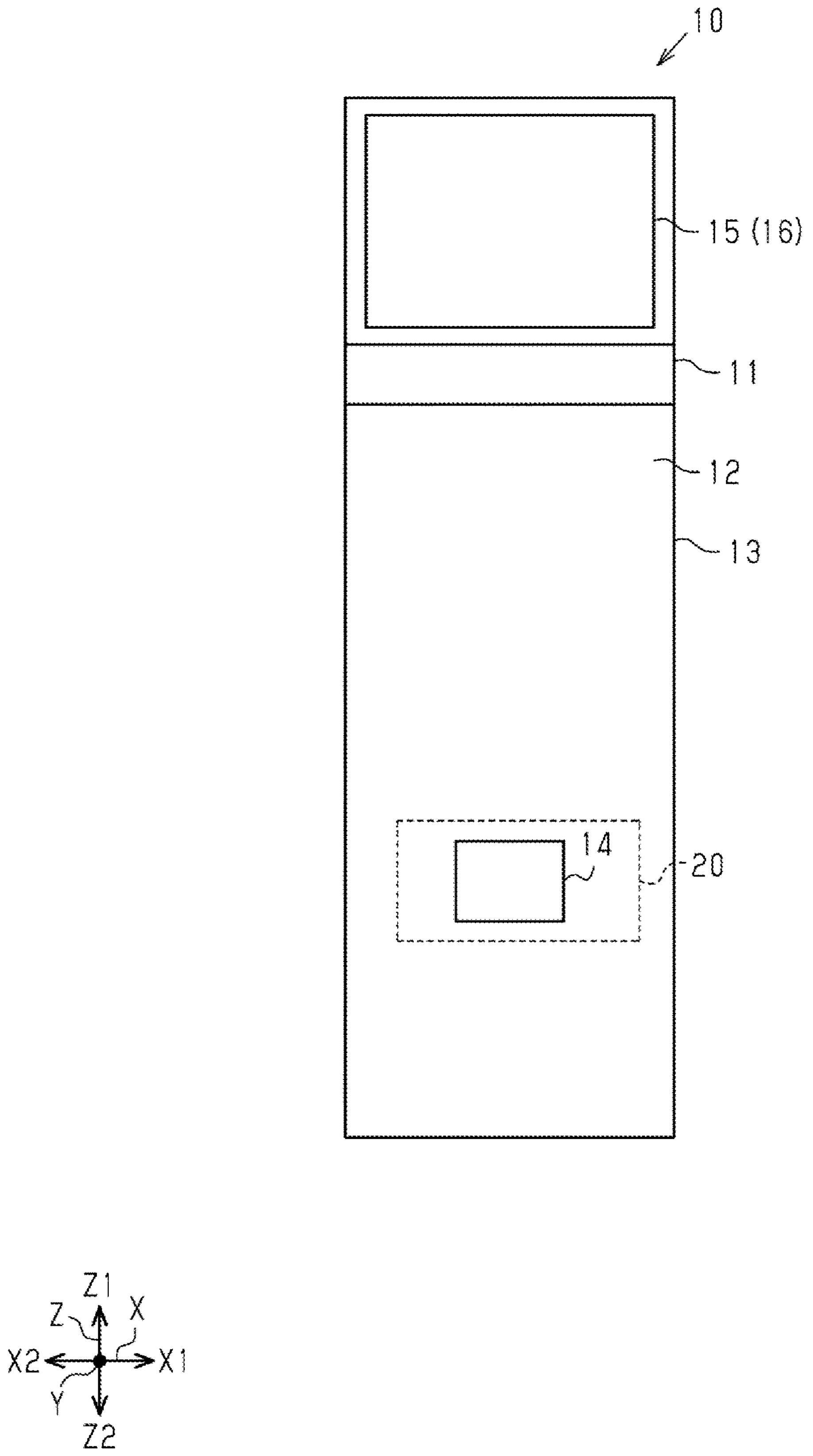
FIG. 2 is a front view illustrating the recording device.

As illustrated in FIGS. 1 and 2, the recording device 10 is a device configured to perform recording on a medium. The recording device 10 may be a self-standing compact information terminal. The recording device 10 includes a housing 11. The housing 11 includes a front face 12. The front face 12 is a surface facing the front side Y1 of the housing 11.

The housing 11 includes an opening/closing door 13. The opening/closing door 13 constitutes at least a part of the front face 12 of the housing 11. The opening/closing door 13 may be configured to be openable and closable by rotating around a rotary shaft (not illustrated) along the vertical direction Z.

The housing 11 includes an extraction port 14. The extraction port 14 is an opening through which a medium on which recording is performed is removable. The extraction port 14 is provided at the front face 12 of the housing 11. The extraction port 14 may be provided at the opening/closing door 13 of the housing 11. Note that, in FIGS. 1 and 2, an internal configuration of the extraction port 14 is omitted, and the internal configuration of the extraction port 14 will be described in detail later with reference to FIG. 9.

The recording device 10 includes a display unit 15. The display unit 15 displays information related to recording. The display unit 15 may also serve as a touch panel 16. The recording device 10 may include a coin slot, a coin return slot, a bill insertion slot, an information medium insertion slot, and a short-range communication device, which are not illustrated. Thus, in the recording device 10, payment for recording, and reception of recording data can be performed.

As illustrated in FIG. 2, the recording device 10 includes a recording unit 20 inside the housing 11. That is, the housing 11 can accommodate the recording unit 20. In the recording device 10, the recording unit 20 can be handled by opening the opening/closing door 13.

The recording unit 20 is a unit that performs recording on a medium. The recording unit 20 may be a unit that performs recording on a medium by discharging liquid. The liquid may be ink. For example, a plurality of kinds of colored liquids or a single kind of colored liquid may be used. The medium may be, for example, a sheet.

Configuration of Recording Unit 20

Figure 3:
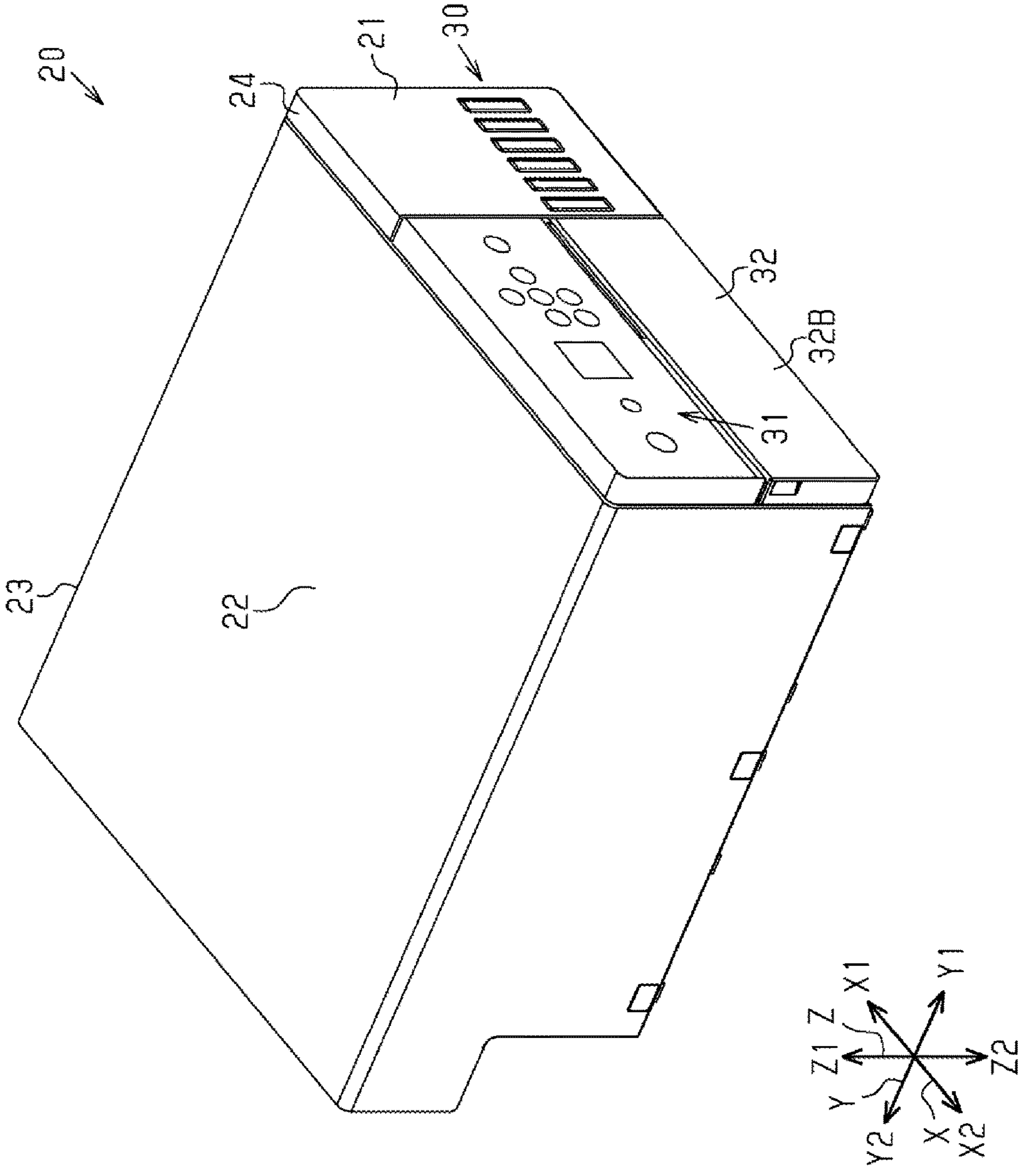
FIG. 3 is a perspective view illustrating a recording unit.

As illustrated in FIG. 3, the recording unit 20 is formed in a rectangular parallelepiped shape. The recording unit 20 includes a front face 21. The front face 21 is a flat surface facing the front side Y1. The front face 21 of the recording unit 20 corresponds to an example of a unit front face. The recording unit 20 includes a top surface 22. The top surface 22 is a flat surface facing the upper side Z1. The top surface 22 includes a flat surface on which a loading object is loadable. The loading object may be another recording unit 20.

The recording unit 20 includes a unit housing 23 and a unit main body 24. The unit housing 23 is configured to accommodation the unit main body 24. The unit housing 23 constitutes at least the top surface 22 of the recording unit 20. The unit main body 24 constitutes at least the front face 12 of the recording unit 20. That is, the unit main body 24 includes the front face 21 of the recording unit 20.

At least a recording portion 40 and a loading portion 49 described later are mounted at the unit main body 24. That is, the unit housing 23 accommodates the unit main body 24, and accommodates at least the recording portion 40 and the loading portion 49 described later. The unit main body 24 is configured to be displaceable along the front-rear direction Y with respect to the unit housing 23. The unit main body 24 can be disposed at a closed position. The closed position is a position where the unit main body 24 is accommodated in the unit housing 23.

Figure 4:
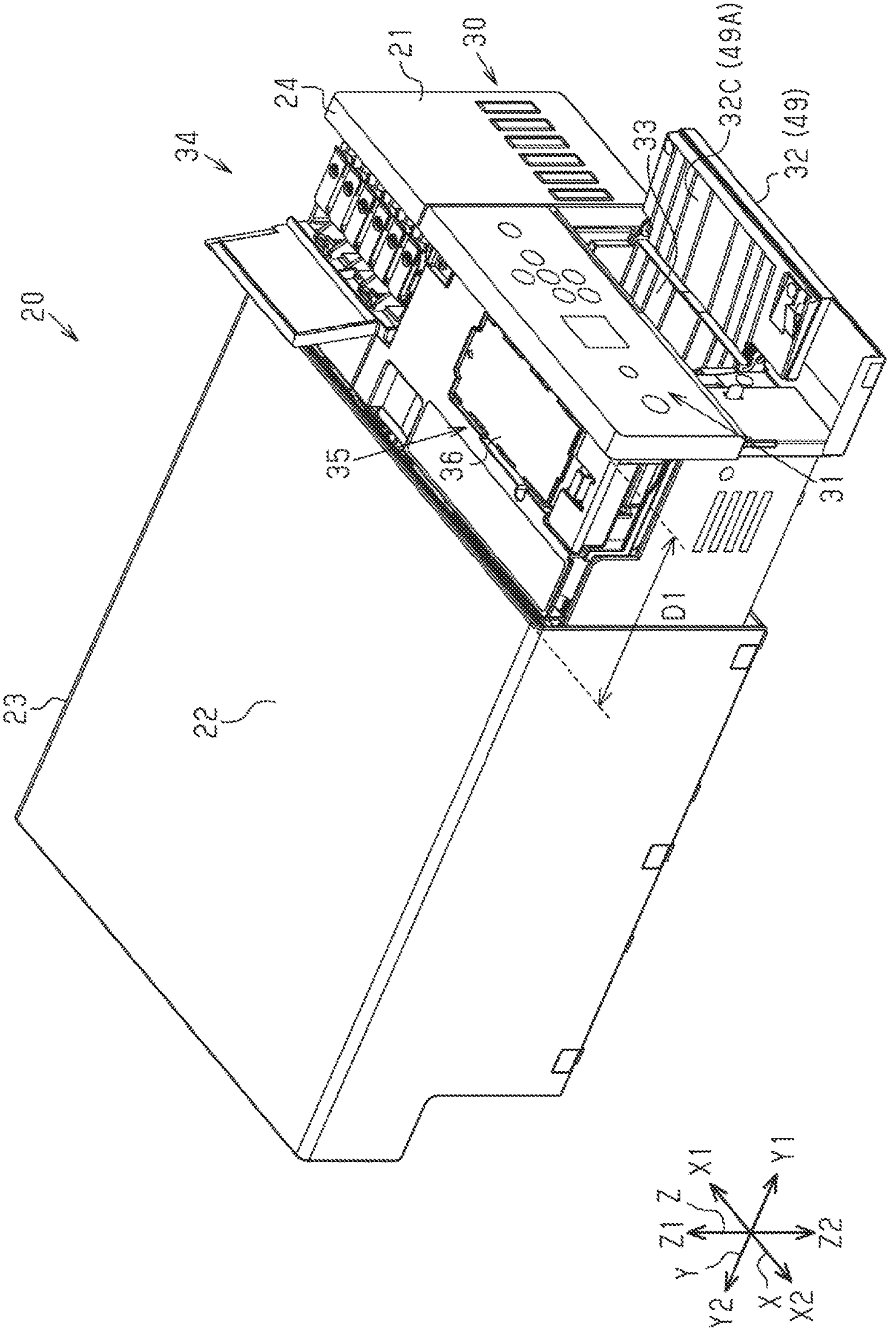
FIG. 4 is a perspective view illustrating the recording unit.

As illustrated in FIG. 4, the unit main body 24 is displaceable to a first open position. The first open position is an open position where the unit main body 24 protrudes from the unit housing 23 toward the front side Y1. In particular, the first open position is a position where the unit main body 24 protrudes from the unit housing 23 toward the front side Y1 by a first distance D1. In this way, when the unit main body 24 is disposed at the first open position, at least a part of an inside of the unit main body 24 is exposed from the unit housing 23.

Figure 5:
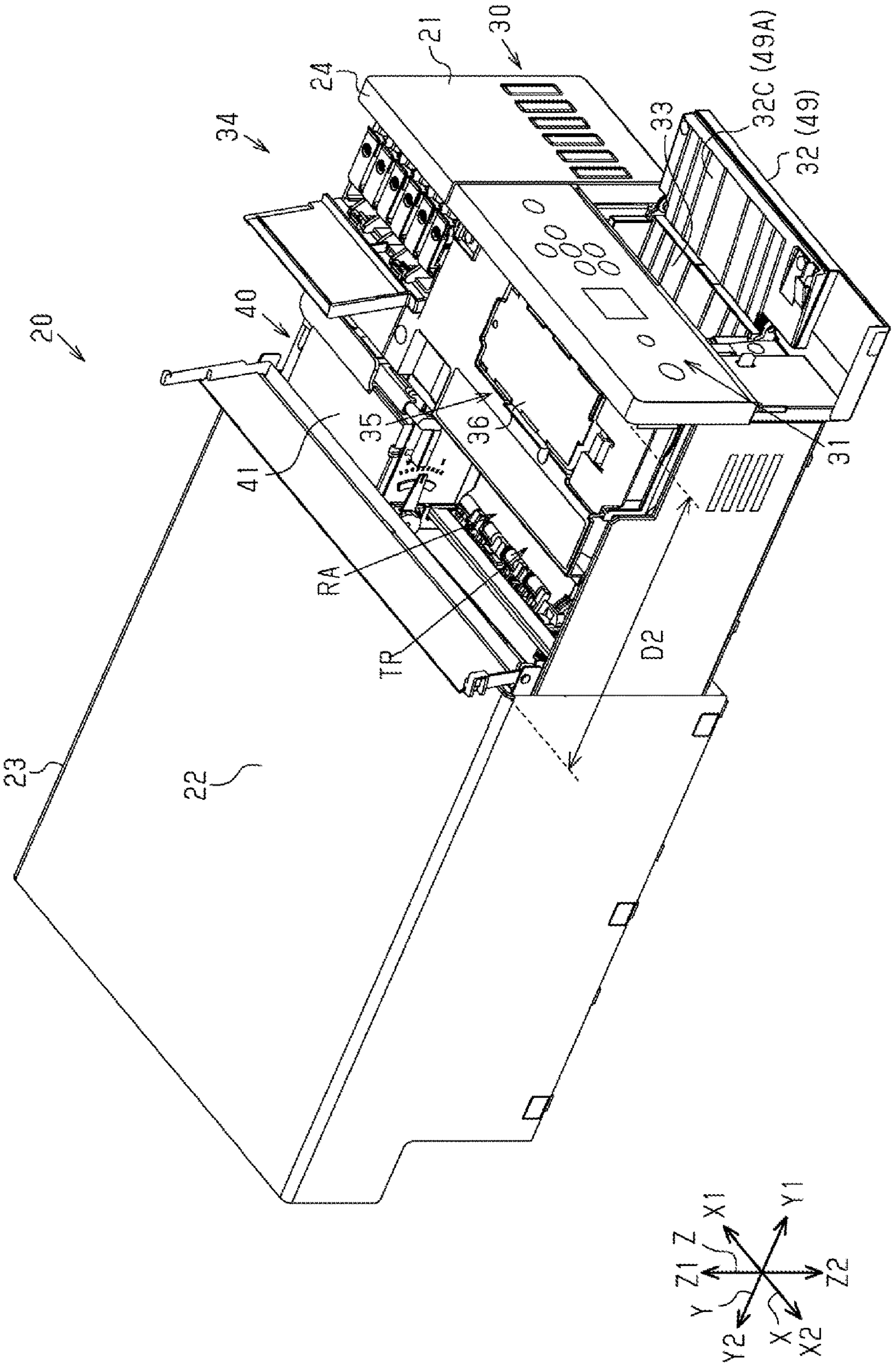
FIG. 5 is a perspective view illustrating the recording unit.

As illustrated in FIG. 5, the unit main body 24 is displaceable to a second open position. The second open position is an open position where the unit main body 24 protrudes from the unit housing 23 toward the front side Y1. In particular, the second open position is a position where the unit main body 24 protrudes from the unit housing 23 toward the front side Y1 by a second distance D2. The second distance D2 is a distance longer than the first distance D1. When the unit main body 24 is disposed at the second open position, at least a part of the inside of the unit main body 24 is exposed from the unit housing 23.

In this way, the unit main body 24 is displaceable between the closed position and the open position with respect to the unit housing 23. Accordingly, in the recording device the inside of the recording unit 20 can be handled, by opening the opening/closing door 13, and displacing the unit main body 24 to the open position with respect to the unit housing 23. The unit main body 24 is displaceable to both of the first open position and the second open position with respect to the unit housing 23, but may be displaceable to either one, or may be displaceable to any other open position.

As illustrated in FIG. 3, the recording unit 20 includes a storage amount viewing portion 30. The storage amount viewing portion 30 is provided at the front face 21 of the recording unit 20. The storage amount viewing portion 30 is provided at the unit main body 24. Through the storage amount viewing portion 30, a stored amount of liquid in a liquid storage portion 34 described later is visible. The storage amount viewing portion 30 includes a plurality of viewing windows corresponding to respective colored liquids.

The recording unit 20 includes an operating panel 31. The operating panel 31 is provided at the front face 21 of the recording unit 20. The operating panel 31 is provided at the unit main body 24. The operating panel 31 includes an operation unit that can be operated by an operator, and a display unit that displays information related to the recording unit 20. Note that, the operating panel 31 may include a touch panel that displays information and detects a touch of the operator.

As illustrated in FIGS. 3 to 6, the recording unit 20 includes an opening/closing cover 32. The opening/closing cover 32 is provided at the front face 21 of the recording unit 20. The opening/closing cover 32 is provided at the unit main body 24.

The opening/closing cover 32 is configured to be rotatable about a rotary shaft 32A extending in the width direction X at a lower end portion. Accordingly, the opening/closing cover 32 is configured to be openable and closable with respect to the front face 21 of the recording unit 20. The opening/closing cover 32 can open and close a discharge port 33 to be described later.

The opening/closing cover 32 includes a first surface 32B and a second surface 32C. The first surface 32B and the second surface 32C are surfaces facing directions opposite to each other. The first surface 32B is a surface constituting a part of the front face 21 of the recording unit 20 with the opening/closing cover 32 closed. The second surface 32C is a surface constituting a part of a loading surface 49A on which a recorded medium is loadable with the opening/closing cover 32 opened. In this way, the second surface 32C of the opening/closing cover 32 constitutes a part of the loading surface 49A with the opening/closing cover 32 opening the discharge port 33 described later. In other words, the opening/closing cover 32 constitutes a part of the loading portion 49 with the discharge port 33 described below opened. The second surface 32C is located outside the unit housing 23 with the opening/closing cover 32 opening the discharge port 33 described later. The second surface 32C may be configured to be expandable and contractible in the front-rear direction Y. That is, the loading portion 49 may be configured to be expandable and contractible in the front-rear direction Y.

Figure 6:
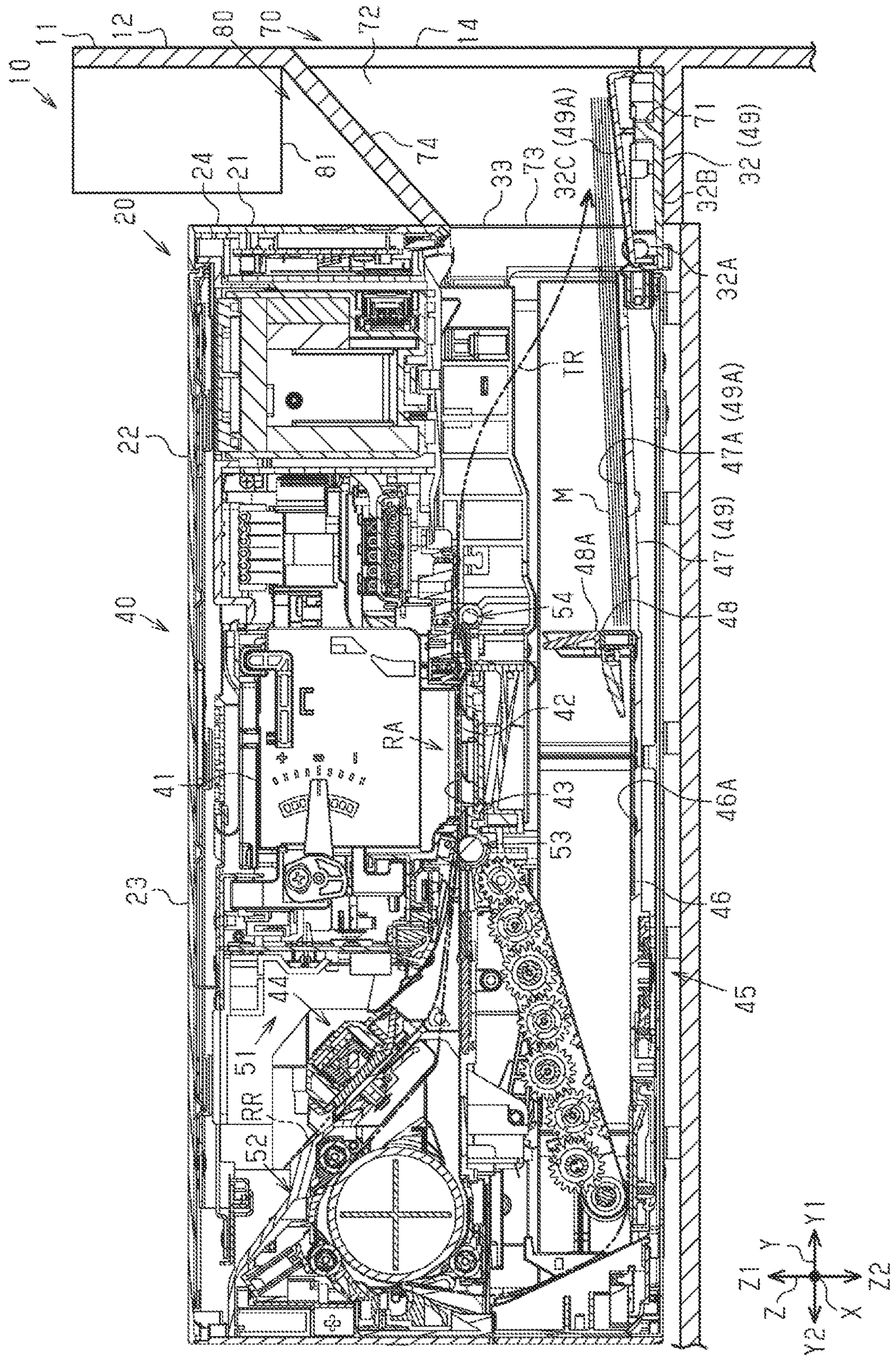
FIG. 6 is a cross-sectional view illustrating the recording device.

As illustrated in FIGS. 4 to 6, the recording unit 20 includes the discharge port 33. The discharge port 33 is provided at the unit main body 24. The discharge port 33 is provided at the front face 21 of the recording unit 20. The discharge port 33 opens toward the front side Y1 of the recording unit 20. Through the discharge port 33, a medium after recording is discharged at the front face 21 of the recording unit 20.

The discharge port 33 is exposed on the front side Y1 of the recording unit 20 with the opening/closing cover 32 opened. The discharge port 33 of the present embodiment is not exposed with the opening/closing cover 32 closed, but may also be exposed with the opening/closing cover 32 closed.

As illustrated in FIG. 4, the recording unit 20 includes a liquid storage portion 34. The liquid storage portion 34 is mounted at the unit main body 24. The liquid storage portion 34 is configured to store liquid used for recording on a medium. The liquid storage portion 34 may be a tank-type storage portion into which liquid can be injected.

The liquid storage portion 34 includes a storage chamber. The storage chamber is configured to store liquid. The liquid storage portion 34 may include a plurality of storage chambers corresponding to respective colored liquids. The liquid storage portion 34 is configured such that liquid can be injected into the storage chamber from a liquid injection port.

The liquid storage portion 34 is not exposed from the unit housing 23 when the unit main body 24 is disposed at the closed position. On the other hand, when the unit main body 24 is disposed at the first open position, the liquid storage portion 34 is exposed from the unit housing 23, and liquid can be injected from the liquid injection port into the storage chamber.

The recording unit 20 includes a waste liquid storage portion 35. The waste liquid storage portion 35 is configured such that a waste liquid storage body 36 can be attached thereto. The waste liquid storage body 36 is configured such that liquid discharged as a waste liquid from the recording portion 40 described below can be collected via a maintenance device (not illustrated). In this way, the waste liquid storage portion 35 can store the liquid discharged as the waste liquid from the recording portion 40. The waste liquid storage portion 35 is mounted at the unit main body 24.

The waste liquid storage portion 35 is not exposed from the unit housing 23 when the unit main body 24 is disposed at the closed position. On the other hand, when the unit main body 24 is disposed at the first open position, the waste liquid storage portion 35 is exposed from the unit housing 23, and the waste liquid storage body 36 can be attached or detached in the waste liquid storage portion 35.

As illustrated in FIGS. 5 and 6, the recording unit 20 includes the recording portion 40. The recording portion 40 is configured to perform recording on a medium. The recording portion 40 is mounted at the unit main body 24.

The recording portion 40 is not exposed from the unit housing 23 when the unit main body 24 is disposed at the closed position and the first open position. On the other hand, the recording portion 40 is exposed from the unit housing 23 when the unit main body 24 is disposed at the second open position.

The recording unit 20 includes a transport route TR. The transport route TR is a route for transporting a medium. The transport route TR is provided at the unit main body 24. The transport route TR includes a recording area RA in which recording on a medium is performed by the recording portion 40.

A part of the transport route TR is not exposed from the unit housing 23 when the unit main body 24 is disposed at the closed position and the first open position. On the other hand, a part of the transport route TR is exposed from the unit housing 23 when the unit main body 24 is disposed at the second open position. In particular, at least a part of the recording area RA is exposed from the unit housing 23 when the unit main body 24 is disposed at the second open position. Thus, handling such as removal of a paper jam becomes possible.

As illustrated in FIG. 6, the recording portion 40 includes a carriage 41 and a liquid discharge head 42. The carriage 41 supports the liquid discharge head 42 from the upper side Z1. The liquid discharge head 42 is provided on the lower side Z2 of the carriage 41. That is, the liquid discharge head 42 is mounted at the carriage 41.

The liquid discharge head 42 includes a plurality of nozzles (not illustrated). Each of the plurality of nozzles is opened toward a medium supported by a support portion 43 described later. Each of the plurality of nozzles discharges liquid. The liquid discharge head 42 discharges liquid from the plurality of nozzles toward the medium supported by the support portion 43. In this manner, the recording portion 40 is configured to perform recording on the medium by discharging the liquid onto the medium. The liquid discharge head 42 is a serial head type that discharges liquid in accordance with movement of the carriage 41 in the width direction X. That is, the recording portion 40 performs recording on a medium while reciprocating in the width direction X. The liquid discharge head 42 may be a line head type.

The recording unit 20 includes the support portion 43. The support portion 43 is mounted at the unit main body 24. The support portion 43 is configured to support a medium. In particular, the support portion 43 supports the medium in the recording area RA in which recording is performed on the medium by the recording portion 40.

The recording unit 20 includes a reading route RR. The reading route RR is a route along which a medium is transported. The reading route RR is provided at the unit main body 24. The reading route RR is a route branching from the transport route TR upstream the recording area RA.

The recording unit 20 includes a reading unit 44. The reading unit 44 is mounted at the unit main body 24. The reading unit 44 is provided at the reading route RR. The reading unit 44 may be provided upstream the recording portion 40. The reading unit 44 reads an image from a medium transported on the reading route RR. The reading unit 44 reads an image from, for example, a medium on which a nozzle check pattern is recorded. The reading unit 44 may be provided at the transport route TR, and the recording unit 20 need not include the reading route RR.

The recording unit 20 includes a medium accommodation portion 45. The medium accommodation portion 45 is configured to be capable of accommodating a medium. In particular, the medium accommodation portion 45 is configured to be capable of accommodating a medium before recording. The medium accommodation portion 45 is configured such a medium after recording is loadable thereon. The medium accommodation portion 45 is mounted at the unit main body 24.

The medium accommodation portion 45 is displaceable along the front-rear direction Y. The medium accommodation portion 45 is configured to be attachable to and detachable from the unit main body 24 by being displaced along the front-rear direction Y. In addition, since the unit main body 24 is accommodated in the unit housing 23, it can be said that the medium accommodation portion 45 is configured to be attachable to and detachable from the unit housing 23.

The medium accommodation portion 45 includes a first accommodation portion 46, a second accommodation portion 47, and a partition wall 48. The first accommodation portion 46 is an accommodation portion capable of accommodating a medium before recording to be transported to the recording portion 40. The first accommodation portion 46 includes a first accommodation surface 46A. The first accommodation surface 46A is a surface capable of accommodating a medium before recording. When the medium accommodation portion 45 is pulled out from the unit main body 24 along the front-rear direction Y, the first accommodation portion 46 is brought into a state where a medium before recording is loadable and a medium before recording is removable.

The second accommodation portion 47 is configured such that a medium after recording by the recording portion 40 is loadable. The second accommodation portion 47 is located on the front side Y1 of the first accommodation portion 46 with the partition wall 48 interposed therebetween. A medium after recording by the recording portion 40 is loadable on the second accommodation portion 47. The second accommodation portion 47 constitutes a part of the loading portion 49. The second accommodation portion 47 includes a second accommodation surface 47A. The second accommodation surface 47A is a surface on which the medium after recording is loadable. In this way, the second accommodation surface 47A constitutes a part of the loading surface 49A in a state where the unit main body 24 is at the closed position, and the medium accommodation portion 45 is attached to the unit main body 24. In other words, the second accommodation portion 47 constitutes a part of the loading portion 49 in the state where the unit main body 24 is at the closed position, and the medium accommodation portion 45 is attached to the unit main body 24. The second accommodation portion 47 is located inside the unit housing 23 in the state where the unit main body 24 is located at the closed position, and the medium accommodation portion 45 is attached to the unit main body 24. That is, a part of the loading portion 49 is provided inside the unit housing 23.

As described above, the recording unit 20 includes the loading portion 49. The loading portion 49 includes the opening/closing cover 32 and the second accommodation portion 47. The loading portion 49 includes the loading surface 49A. The loading surface 49A includes the second surface 32C of the opening/closing cover 32 and the second accommodation surface 47A of the second accommodation portion 47. The loading surface 49A is inclined upward toward the front side Y1. Here, the second accommodation surface 47A is located inside the unit housing 23 of the recording unit 20.

The partition wall 48 partitions the first accommodation portion 46 and the second accommodation portion 47. The partition wall 48 is located at an end portion on the rear side Y2 of the second accommodation portion 47. That is, the partition wall 48 is located at an end portion on the rear side Y2 of the loading portion 49. The partition wall 48 includes a partition surface 48A. The partition surface 48A is a surface facing the front side Y1. The partition wall 48 may be displaceable in the front-rear direction Y.

The recording unit 20 includes a transport unit 51. The transport unit 51 is configured to transport the medium. The transport unit 51 is mounted at the unit main body 24. The transport unit 51 feeds a medium loaded in the first accommodation portion 46 one at a time. The transport unit 51 transports the fed medium along the transport route TR.

The transport unit 51 includes a plurality of rollers, and a plurality of motors serving as driving sources. In particular, the transport unit 51 may include a reversing unit 52. The reversing unit 52 reverses a transport direction of a medium before recording from the rear side Y2 to the front side Y1.

The transport unit 51 includes a transport roller pair 53. The transport roller pair 53 is located upstream the support portion 43 in the transport route TR. The transport roller pair 53 transport a medium to the support portion 43 along the transport route TR.

The transport unit 51 includes a discharge unit 54. The discharge unit 54 is located downstream the support portion 43 in the transport route TR. The discharge unit 54 discharges a medium after recording by the recording portion 40 along the transport route TR.

Configuration of Discharge Unit 54

Figure 7:
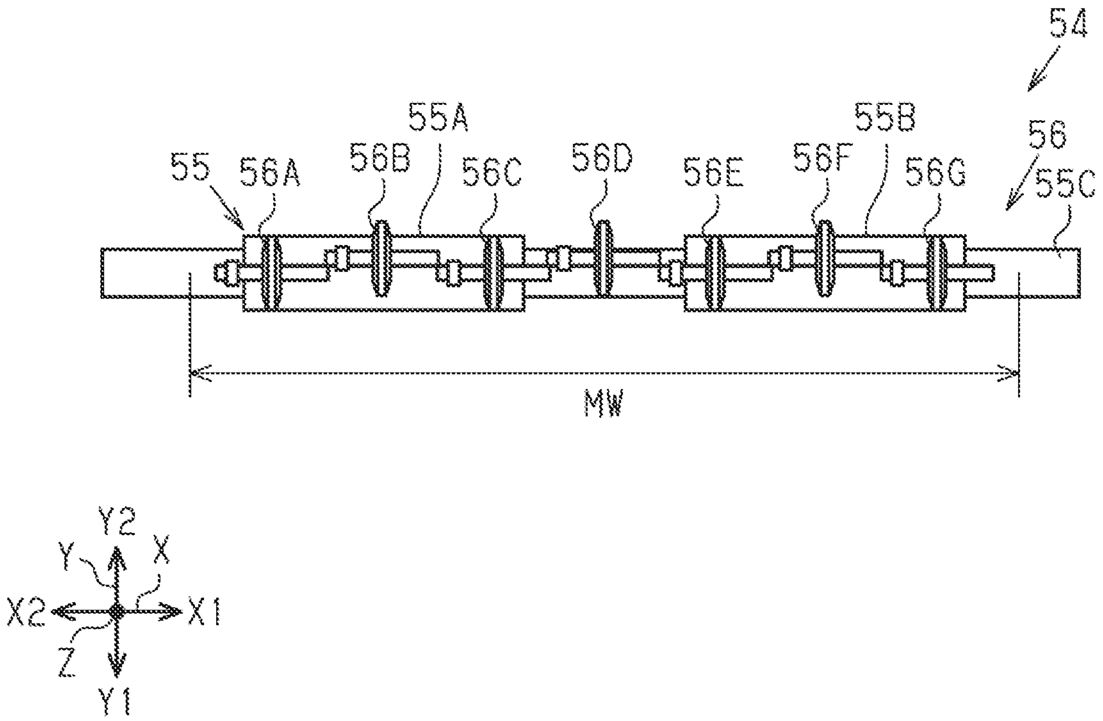
FIG. 7 is a top view illustrating a discharge unit.
Figure 8:
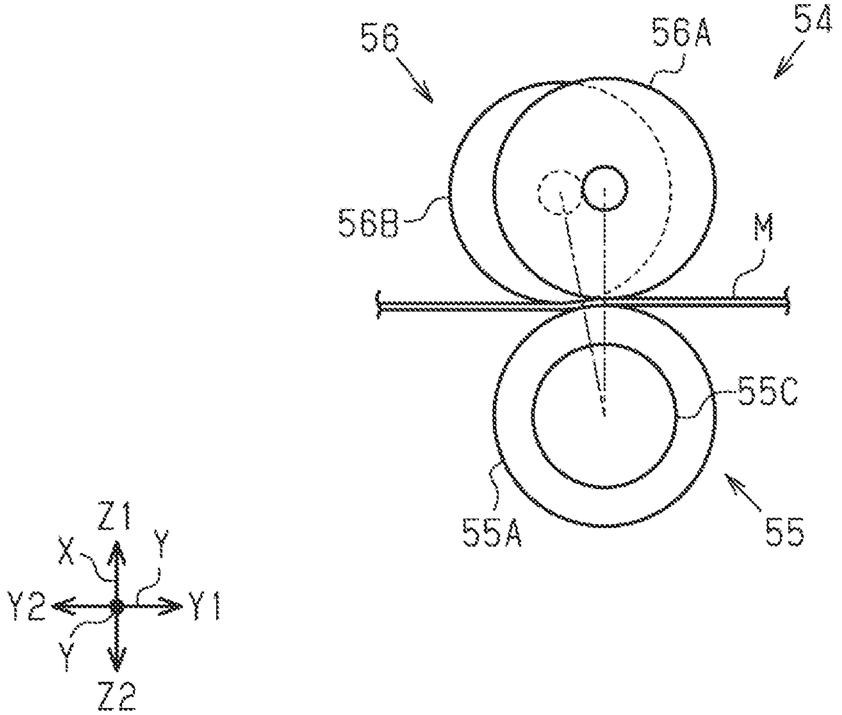
FIG. 8 is a side view illustrating the discharge unit.

As illustrated in FIGS. 7 and 8, the discharge unit 54 includes a discharge driving roller 55, and a discharge driven roller 56. The discharge driving roller 55 is rotated by a driving force from a driving source (not illustrated). The discharge driving roller 55 abuts on a medium M from the lower side Z2 side. The discharge driven roller 56 abuts on the medium M from the upper side Z1 side. In this way, the discharge unit 54 discharges the medium M after recording to the front side Y1 in a state of being nipped by the discharge driving roller 55 and the discharge driven roller 56. The front side Y1 corresponds to an example of a discharge direction. In addition, the discharge driving roller 55 may abut on the medium M from the upper side Z1 side, and the discharge driven roller 56 may abut on the medium M from the lower side Z2 side.

The discharge driving roller 55 may include a first discharge driving roller 55A, a second discharge driving roller and a driving shaft 55C. The first discharge driving roller 55A extends in the width direction X. The second discharge driving roller 55B extends in the width direction X. The driving shaft 55C extends along the width direction X. The first discharge driving roller 55A and the second discharge driving roller 55B are supported by the driving shaft 55C so as to be aligned in the width direction X.

The first discharge driving roller 55A and the second discharge driving roller 55B abut on a medium after recording from the lower side Z2 side. The first discharge driving roller and the second discharge driving roller 55B are configured to rotate about the driving shaft 55C.

Each of the first discharge driving roller 55A and the second discharge driving roller 55B is disposed within a range of a medium width MW of the media M in the width direction X. Each of the first discharge driving roller 55A and the second discharge driving roller 55B has a length corresponding to several existing driving rollers in the width direction X. Accordingly, with the discharge driving roller 55, the number of driving rollers can be reduced, and a contact area with the medium M after recording can be increased. Thus, it is possible to suppress the reduction in transport accuracy.

In addition, as the number of driving rollers is increased, the number of end surfaces of the driving rollers in the width direction X is increased. When cutting and polishing the driving roller, the end surface of the driving roller may protrude. When the end surface of the driving roller protrudes, the transport accuracy is reduced. Therefore, in the present embodiment, by reducing the number of driving rollers, it is possible to reduce the number of end surfaces of the driving rollers. Therefore, it is possible to suppress a decrease in the transport accuracy.

The discharge driven roller 56 includes a plurality of driven rollers 56A to 56G. The plurality of driven rollers 56A to 56G are disposed so as to be aligned in the width direction X. Each of the plurality of driven rollers 56A to 56C is disposed at a position facing the first discharge driving roller Each of the plurality of driven rollers 56E to 56G is disposed at a position facing the second discharge driving roller 55B.

Each of the plurality of driven rollers 56A to 56G includes a driven shaft. Each of the plurality of driven rollers 56A, 56C, 56E, and 56G is disposed such that the driven shaft is located on the upper side Z1 of the driving shaft 55C. On the other hand, each of the plurality of driven rollers 56B, 56D, and 56F is disposed such that the driven shaft is located on the rear side Y2 of the driving shaft 55C. In other words, each of the plurality of driven rollers 56B, 56D, and 56F is disposed such that a distance between the driven shaft and the driving shaft 55C is the same, but an angle between the driven shaft and the driving shaft 55C is different as compared to each of the plurality of driven rollers 56A, 56C, 56E, and 56G.

Accordingly, with respect to the front-rear direction Y, a point at which each of the plurality of driven rollers 56A and 56C comes into contact with the first discharge driving roller 55A, and a point at which the driven roller 56B comes into contact with the first discharge driving roller 55A can be made different from each other. Additionally, with respect to the front-rear direction Y, a point at which each of the plurality of driven rollers 56E and 56G comes into contact with the second discharge driving roller 55B, and a point at which the driven roller 56F comes into contact with the second discharge driving roller 55B can be made different from each other. As a result, the discharge driving roller 55 and the discharge driven roller 56 easily come into surface contact with each other with respect to the front-rear direction Y. As described above, in the present embodiment, in the discharge unit 54, a contact area with the medium M after recording can be increased. Thus, it is possible to suppress a decrease in transport accuracy. Furthermore, with this configuration, a load when a leading end of the medium M enters the discharge driven roller 56 is dispersed and reduced, and thus it is possible to improve the transport accuracy.

In addition, each of the plurality of driven rollers 56B, 56D, and 56F can press the medium M against the support portion 43 in the recording area RA by the driven shaft being located on the rear side Y2 of the driving shaft 55C. Accordingly, it is possible to improve the recording accuracy of the recording portion 40.

Discharging Configuration of Medium after Recording

Figure 9:
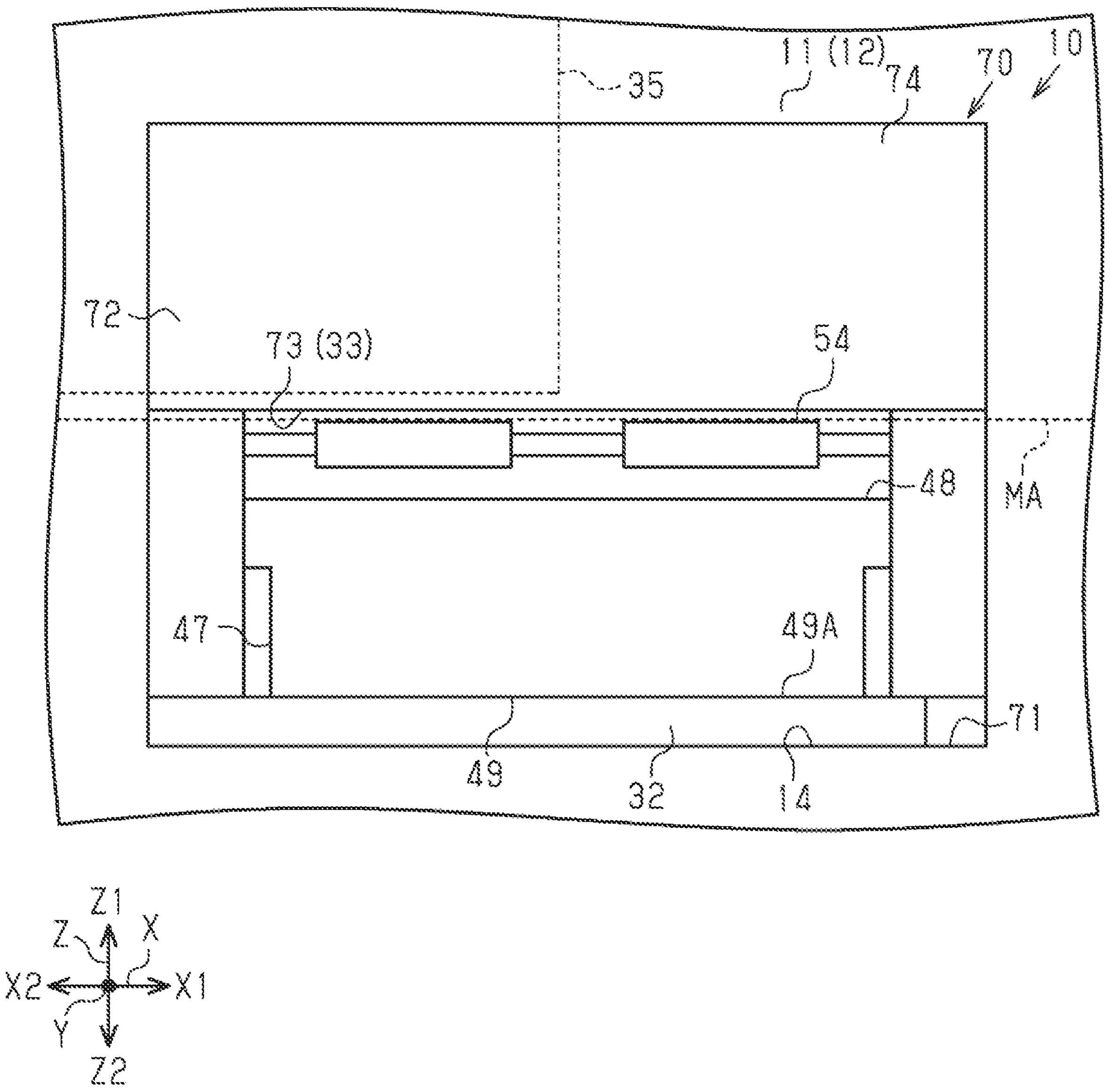
FIG. 9 is a front view illustrating the recording device.

As illustrated in FIGS. 6 and 9, the recording device includes a extraction portion 70. The extraction portion 70 may be provided inside the housing 11. The extraction portion is included in the housing 11, but need not be included in the housing 11. As described above, the housing 11 includes the extraction portion 70.

The extraction portion 70 accommodates the opening/closing cover 32 with the discharge port 33 opened. Therefore, even in the state where the discharge port 33 is opened, the opening/closing cover 32 does not protrude from the extraction port 14, and does not protrude from the front face 12 of the housing 11.

In addition, the opening/closing cover 32 can be displaced between the state where the discharge port 33 is opened, and a state where the discharge port 33 is closed, by an operation from the extraction port 14, in a state of being installed at the recording device 10. Even when the opening/closing cover 32 is expandable and contractible, the opening/closing cover 32 can be expanded and contracted by an operation from the extraction port 14, in a state of being installed at the recording device 10.

The extraction portion 70 includes a bottom surface 71. The bottom surface 71 is a surface on which the first surface 32B of the opening/closing cover 32 abuts, when the opening/closing cover 32 of the recording unit 20 is opened. However, the extraction portion 70 need not be configured to include the bottom surface 71. In this case, the loading portion 49 may define a lower end of an extraction area 72.

The extraction portion 70 includes the extraction area 72. The extraction area 72 includes the extraction port 14. The extraction port 14 is located at an end portion on the front side Y1 of the extraction area 72. The extraction area 72 is a spatial area in which the medium M after recording loaded on the loading portion 49 is removable from the front side Y1 side. In this manner, the extraction portion 70 is configured to divide the extraction area 72.

The extraction area 72 is configured to overlap a part of the loading portion 49 when viewed from the vertical direction Z. In particular, the extraction area 72 is configured to overlap a part of the opening/closing cover 32, with the opening/closing cover 32 opening the discharge port 33, when viewed from the vertical direction Z.

The extraction area 72 is configured to overlap a part of the discharge port 33 when viewed from the front side Y1. The extraction area 72 is configured to overlap a part of the discharge unit 54 when viewed from the front side Y1. The extraction area 72 is configured to overlap a part of a movement area MA of the recording portion 40 when viewed from the front side Y1.

When the medium accommodation portion 45 is attached to the unit housing 23, the extraction area 72 overlaps a part of the medium accommodation portion 45 when viewed from the front side Y1. In other words, when the medium accommodation portion is attached to the unit housing 23, the extraction area 72 overlaps a part of the first accommodation portion 46 when viewed from the front side Y1. When the medium accommodation portion 45 is attached to the unit housing 23, the extraction area 72 overlaps a part of the second accommodation portion 47 when viewed from the front side Y1.

The extraction portion 70 includes a communication port 73. The communication port 73 is disposed in the extraction portion 70 when viewed from the front side Y1. The communication port 73 is located at an end portion on the rear side Y2 of the extraction area 72. That is, the extraction area 72 includes the communication port 73. The communication port 73 is an opening that communicates with the discharge port 33 of the recording unit 20. That is, the communication port 73 is an opening through which a medium after recording is discharged from the recording unit 20 is discharged.

The communication port 73 is configured to include the discharge port 33 of the recording unit 20 when viewed from the front side Y1. The discharge port 33 of the recording unit 20 is disposed in the communication port 73 when viewed from the front side Y1. That is, the communication port 73 is configured to include the discharge port 33 when viewed from the front side Y1. In other words, the discharge port 33 is configured to be included in the communication port 73 when viewed from the front side Y1.

Further, when the medium accommodation portion 45 is attached to the unit housing 23, the communication port 73 is configured to overlap a part of the medium accommodation portion of the recording unit 20 when viewed from the front side Y1. In other words, the communication port 73 is configured to overlap a part of the first accommodation portion 46 of the recording unit 20 when viewed from the front side Y1. The communication port 73 is configured to overlap a part of the second accommodation portion 47 of the recording unit 20 when viewed from the front side Y1.

The extraction portion 70 includes an upper inner wall surface 74. The upper inner wall surface 74 is a surface that defines an upper end of the extraction area 72. The upper inner wall surface 74 is inclined upward toward the front side Y1 so that the extraction area 72 widens toward the front side Y1. Therefore, when a predetermined position of the upper inner wall surface 74 in the front-rear direction Y is referred to as a first position, and a position on the front side Y1 of the first position is referred to as a second position, it can be said that the upper inner wall surface 74 is a surface where the second position is located on the upper side Z1 as compared with the first position.

The upper inner wall surface 74 is configured to overlap a part of the movement area MA of the recording portion 40 when viewed from the front side Y1. The upper inner wall surface 74 is configured to overlap a part of the waste liquid storage portion 35 when viewed from the front side Y1.

Further, the recording device 10 includes an installation area 80. It can also be said that the installation area 80 is provided at the housing 11. That is, the housing 11 may include the installation area 80. The installation area 80 is located between the front face 12 of the housing 11 and the recording unit 20 on the upper side Z1 of the extraction area 72. Specifically, the installation area 80 is located on the rear side Y2 of the front face 12 of the housing 11, and on the front side Y1 of the front face 21 of the recording unit 20.

A structure 81 related to the recording device 10 can be installed in the installation area 80. The structure 81 may be, for example, a mechanical structure of the recording device such as a coin discharge path through which coins are discharged. In addition, the structure 81 may be an electrical structure of the recording device 10 such as an electronic circuit of the recording device 10.

Operation of First Embodiment

Operation of the first embodiment will be described.

When the recording unit 20 is used alone, a medium after recording discharged from the discharge unit 54 is loaded on the loading portion 49 through the discharge port 33. On the other hand, also when the recording unit 20 is used in the recording device 10, similarly, a medium after recording discharged from the discharge unit 54 is loaded on the loading portion 49 through the discharge port 33 and the communication port 73. As a result, it is possible to improve an alignment property of the medium after recording, and it is possible to extract the medium after recording loaded on the loading portion 49 from the extraction port 14 provided at the front face 12 of the recording device 10.

Specifically, in the housing 11, the extraction area 72 divided by the extraction portion 70 overlaps a part of the loading surface 49A of the recording unit 20 when viewed from the vertical direction Z. For this reason, it becomes easy to extract the medium after recording loaded on the loading portion 49 from the extraction port 14. In addition, in the housing 11, the upper inner wall surface 74 that defines the upper end of the extraction area 72 is inclined upward toward the front side Y1, thus it is easy to extract the medium after recording loaded on the loading portion 49 from the extraction port 14.

In addition, even when recording on a medium is performed by the recording portion 40 with the opening/closing door 13 opened, the medium is loadable on the loading portion 49. As a specific example, in a state where the opening/closing door 13 is opened in order to handle the recording unit 20, an image such as a nozzle check pattern, for example, is recorded on a medium by the recording portion 40, and the image is read by the reading unit 44, in some cases. Even in such a case, the medium discharged after being read by the reading unit 44 is loaded on the loading portion 49. Therefore, it is possible to prevent the discharged medium from dropping and to improve operability.

Effects of First Embodiment

Effects of the first embodiment will be described.

(1) Even in the configuration in which the housing 11 that accommodates the recording portion 20 is provided, a medium loaded on the loading portion 49 of the recording unit 20 is removable from the front side Y1 side, by the extraction portion being provided that demarcates the extraction area 72. For this reason, as compared to a configuration in which a medium after recording drops from the recording unit 20 to the extraction portion 70, it is possible to improve an alignment property of the medium after recording.

(2) The upper inner wall surface 74 that defines the upper end of the extraction area 72 widens toward the upper side Z1 at the second position on the front side Y1 of the first position, as compared to the first position. For this reason, when a medium after recording is extracted from the extraction area 72, a hand can be easily inserted. This improves operability.

(3) The extraction area 72 overlaps a part or all of the loading portion 49 when viewed from the vertical direction Z. According to this, it is possible to bring the loading portion 49 and the extraction area 72 close to each other, and it is easy to extract a medium loaded on the loading portion 49. This improves operability. In addition, it is possible to bring the recording unit 20 and the extraction area 72 close to each other, and it is possible to suppress an increase in size of the recording device 10.

(4) The structure 81 related to the recording device 10 can be installed between the housing 11 and the recording unit on the upper side Z1 of the extraction area 72. Accordingly, an increase in size of the recording device 10 can be suppressed.

(5) It is possible to constitute the recording device using the recording unit 20 provided with the loading portion 49. Therefore, in the recording unit 20, it is possible to enhance versatility of discharging of a medium after recording.

(6) The upper inner wall surface 74 is provided so as to overlap a part of the movement area MA of the recording portion 40 when viewed from the front side Y1. For this reason, it is possible to bring the movement area MA of the recording portion 40 and the upper inner wall surface 74 close to each other. Accordingly, an increase in size of the recording device can be suppressed.

(7) The upper inner wall surface 74 is provided so as to overlap a part of the waste liquid storage portion 35 when viewed from the front side Y1. Therefore, the waste liquid storage portion 35 and the upper inner wall surface 74 can be brought close to each other. Accordingly, an increase in size of the recording device 10 can be suppressed.

(8) The extraction area 72 is provided so as to overlap a part of the discharge unit 54 when viewed from the front side Y1. Therefore, a discharge position of a medium after recording and the extraction area 72 can be brought close to each other. Accordingly, an increase in size of the recording device 10 can be suppressed.

(9) The extraction area 72 is provided so as to overlap a part or all of the movement area MA of the recording portion when viewed from the front side Y1. For this reason, it is possible to bring the movement area MA of the recording portion and the extraction area 72 close to each other. Accordingly, an increase in size of the recording device 10 can be suppressed.

(10) The communication port 73 is provided so as to include the discharge port 33 when viewed from the front side Y1. Therefore, by causing the discharge port 33 and the extraction area 72 to communicate with each other via the communication port 73, it becomes easy to extract a medium loaded on the loading portion 49. This improves operability.

(11) When viewed from the vertical direction Z, the extraction area 72 is provided so as to overlap a part of the opening/closing cover 32 with the discharge port 33 opened. Therefore, the opening/closing cover 32 and the extraction area 72 can be brought close to each other. Accordingly, an increase in size of the recording device 10 can be suppressed.

(12) It is possible to bring the opening/closing cover 32 and the extraction area 72 close to each other, and it is easy to extract a medium loaded on the opening/closing cover 32. This improves operability.

(13) The loading portion 49 is inclined upward toward the front side Y1 with the opening/closing cover 32 opening the discharge port 33. According to this, it is possible to prevent a medium after recording from jumping out from the loading portion 49. Therefore, an alignment property of a medium after recording can be improved.

(14) The extraction area 72 is provided so as to overlap a part of the medium accommodation portion 45 when viewed from the front side Y1. For this reason, it is possible to bring the recording unit 20 and the extraction area 72 close to each other, and it is possible to suppress an increase in size of the recording device 10.

(15) The communication port 73 is provided so as to overlap a part of the medium accommodation portion 45 when viewed from the front side Y1. For this reason, it is possible to bring the recording unit 20 and the communication port 73 close to each other, and it is possible to suppress an increase in size of the recording device 10.

(16) Since the medium accommodation portion 45 including both the first accommodation portion 46 and the second accommodation portion 47 is provided, both a medium before recording and a medium after recording can be accommodated. In addition, even in the recording unit 20 including such a medium accommodation portion 45, the extraction area 72 is provided so as to overlap a part of the first accommodation portion 46 when viewed from the front side Y1. In addition, the extraction area 72 is provided so as to overlap a part of the second accommodation portion 47 when viewed from the front side Y1. For this reason, it is possible to bring the recording unit 20 and the extraction area 72 close to each other, and it is possible to suppress an increase in size of the recording device 10.

(17) The communication port 73 is provided so as to overlap a part of the first accommodation portion 46 when viewed from the front side Y1, and to overlap a part of the second accommodation portion 47 when viewed from the front side Y1. For this reason, it is possible to bring the recording unit 20 and the communication port 73 close to each other, and it is possible to suppress an increase in size of the recording device 10.

(18) By displacing the unit main body 24 with respect to the unit housing 23, it is possible to facilitate handling of the recording portion 40 and the loading portion 49 mounted at the unit main body 24. This improves operability.

Second Embodiment

Next, a second embodiment will be described. In the following description, configurations identical to those in the already described embodiment will be denoted by the same reference signs, and redundant descriptions thereof will be omitted or simplified.

Configuration of Recording Unit 20

Figure 10:
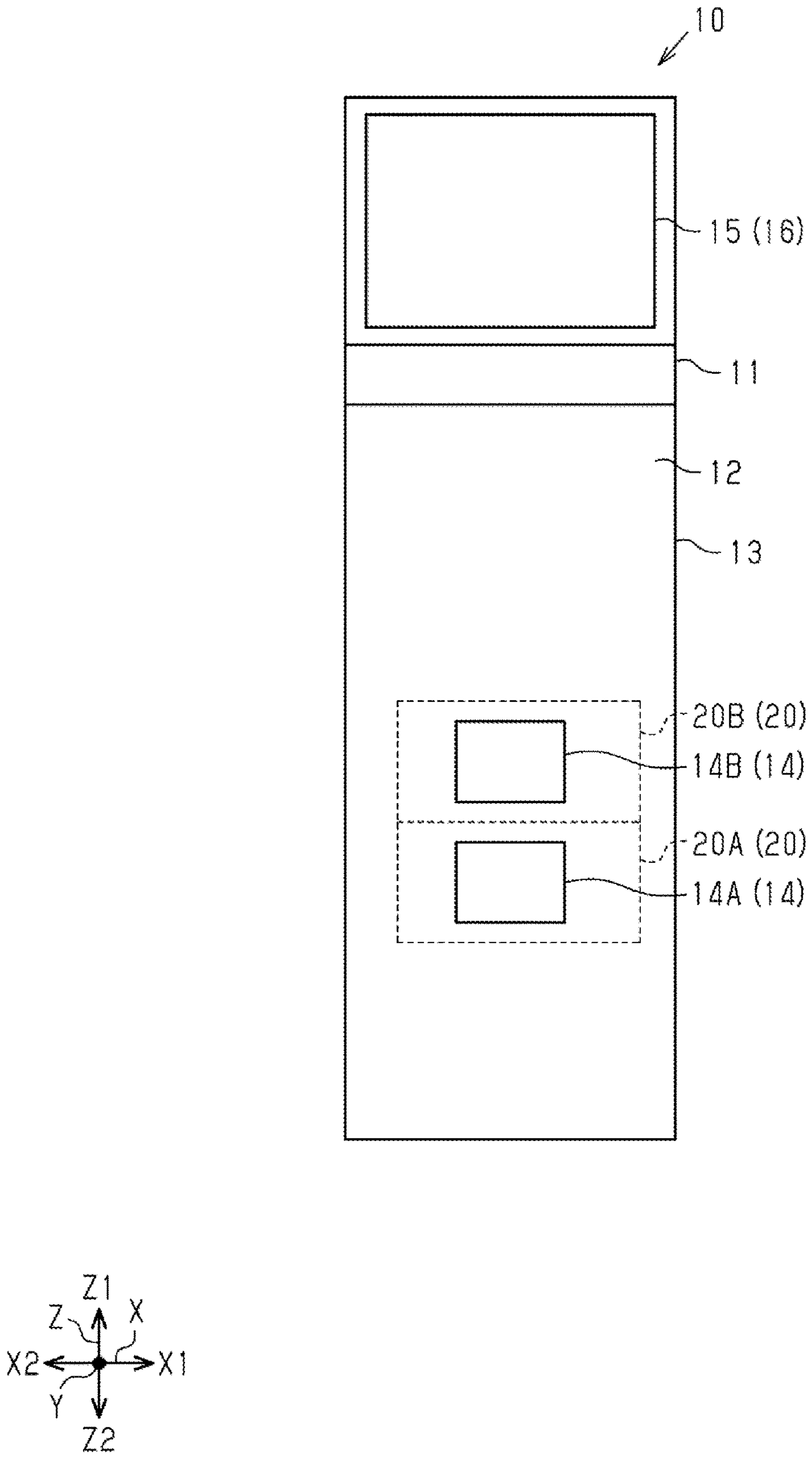
FIG. 10 is a front view illustrating the recording device.

As illustrated in FIG. 10, the recording device 10 may include a plurality of the recording units 20. The recording device 10 may include a first recording unit 20A and a second recording unit 20B as the two recording units 20. The recording device 10 may include the three or more recording units 20. The first recording unit 20A and the second recording unit 20B are loaded in the vertical direction Z. The second recording unit is loaded on the upper side Z1 of the first recording unit 20A.

The housing 11 may include a first extraction port 14A and a second extraction port 14B as the extraction ports 14. The first extraction port 14A is an opening through which a medium on which recording is performed by the first recording unit 20A is removable. The second extraction port 14B is an opening through which a medium on which recording is performed by the second recording unit 20B is removable. Note that, in FIG. 10, internal configurations of the first extraction port 14A and the second extraction port 14B are omitted. The internal configurations of both the first extraction port 14A and the second extraction port 14B are the same as the internal configuration of the extraction port 14 illustrated in FIG. 9.

Modifications

The present embodiment can be modified and implemented as follows. The present embodiment and the following modifications can be combined and implemented within a technically consistent range.

The loading surface 49A may be a surface parallel to a horizontal surface. That is, the loading surface 49A may be a surface along a horizontal surface. The loading surface 49A may be inclined downward toward the front side Y1.

The opening/closing cover 32 may constitute the entire loading surface 49A with the discharge port 33 opened.

The opening/closing cover 32 is attached to the medium accommodation portion 45, but may be attached to the first accommodation portion 46 or may be attached to the second accommodation portion 47. The opening/closing cover 32 may be attached to the unit main body 24. The opening/closing cover 32 may be attached to the unit housing 23.

The opening/closing cover 32 may be attachable to and detachable from the recording unit 20. In this way, when the opening/closing cover 32 is removed, half a length of the medium in the front-rear direction Y may be loadable on the second accommodation portion 47.

The opening/closing cover 32 may protrude from the extraction port 14 to the front side Y1 with the discharge port 33 opened. As a result, a leading end of the loading portion 49 protrudes from the extraction port 14, so that it is easy to extract a medium after recording loaded on the loading portion 49.

The medium accommodation portion 45 need not include any one of the first accommodation portion 46 and the second accommodation portion 47.

The extraction area 72 may be provided so as to overlap a part of the operating panel 31 when viewed from the front side Y1. The extraction area 72 may be provided so as to overlap a part of the reading unit 44 when viewed from the front side Y1. The extraction area 72 may be provided so as to overlap a part of the reversing unit 52 when viewed from the front side Y1. The extraction area 72 may be provided so as to overlap a part of the liquid storage portion 34 when viewed from the front side Y1. The extraction area 72 may be provided so as to overlap a part of a liquid tube that couples the liquid storage portion 34 and the recording portion 40 when viewed from the front side Y1.

The extraction area 72 may be configured to overlap the entire loading portion 49 when viewed from the vertical direction Z. The extraction area 72 may be configured to overlap the entire opening/closing cover 32 when viewed from the vertical direction Z with the opening/closing cover 32 opening the discharge port 33.

The extraction area 72 may be configured to overlap the entire discharge port 33 when viewed from the front side Y1. The extraction area 72 may be configured to overlap the entire discharge unit 54 when viewed from the front side Y1. The extraction area 72 may be configured to overlap the entire movement area MA of the recording portion 40 when viewed from the front side Y1.

The extraction area 72 may be configured to overlap the entire medium accommodation portion 45 when viewed from the front side Y1. The extraction area 72 may be configured to overlap the entire first accommodation portion 46 when viewed from the front side Y1. The extraction area 72 may be configured to overlap the entire second accommodation portion 47 when viewed from the front side Y1.

The communication port 73 may be configured to overlap the entire medium accommodation portion 45 of the recording unit 20 when viewed from the front side Y1. The communication port 73 may be configured to overlap the entire first accommodation portion 46 when viewed from the front side Y1. The communication port 73 may be configured to overlap the entire second accommodation portion 47 when viewed from the front side Y1.

The upper inner wall surface 74 may be configured to overlap the entire movement area MA of the recording portion 40 when viewed from the front side Y1. The upper inner wall surface 74 may be configured to overlap the entire waste liquid storage portion 35 when viewed from the front side Y1.

The upper inner wall surface 74 may be provided so as to overlap a part of the operating panel 31 when viewed from the front side Y1. The upper inner wall surface 74 may be provided so as to overlap a part of the reading unit 44 when viewed from the front side Y1. The upper inner wall surface 74 may be provided so as to overlap a part of the reversing unit 52 when viewed from the front side Y1. The upper inner wall surface 74 may be provided so as to overlap a part of the liquid storage portion 34 when viewed from the front side Y1. The upper inner wall surface 74 may be provided so as to overlap a part of a liquid tube coupling the liquid storage portion 34 and the recording portion 40 when viewed from the front side Y1.

The upper inner wall surface 74 may be an inclined surface or a curved surface. That is, when a predetermined position of the upper inner wall surface 74 in the front-rear direction Y is referred to as a first position, and a position on the front side Y1 of the first position is referred to as a second position, it can be said that the upper inner wall surface 74 is a surface where the second position is located on the upper side Z1 as compared with the first position.

The extraction portion 70 may include both side inner wall surfaces defining both side ends of the extraction area 72, and the both side inner wall surfaces may be provided so as to widen toward the front side Y1.

In the embodiment described above, the serial printer is adopted as the recording unit 20, but the present disclosure is not limited thereto. For example, a lateral type printer may be adopted or a line type printer may be adopted as the recording unit 20. The lateral type printer is a printer in which a carriage is movable in two directions of a main scanning direction and a sub-scanning direction. The line type printer is a printer including a plurality of nozzles arranged at a constant pitch in the width direction X, and capable of simultaneously discharging liquid over a width of a medium.

The medium is not limited to a sheet. The medium may be a resin film or sheet, a composite film of resin and metal, a laminate film, a woven fabric, a nonwoven fabric, a metal foil, a metal film, a ceramic sheet, clothing, or the like. Further, the medium may be a medium fed from a roll body.

Liquid can be freely selected as long as the liquid can be recorded on a medium by adhering to the medium. For example, an ink includes various compositions such as an aqueous ink, an oil-based ink, a gel ink, a hot melt ink, or the like, including particles of a functional material made of a solid such as pigments or metal particles dissolved, dispersed or mixed in a solvent.

The recording unit 20 is not limited to an ink jet-type printer, and may be a dot impact-type printer.

A recording method of the recording unit 20 may be a laser method instead of an ink jet method.

As used herein, a phrase "at least one of" means one or more of desired alternatives. As an example, the phrase "at least one of" as used herein means both only one alternative or two alternatives when the number of alternatives is two. As another example, as used herein, the phrase "at least one of" means only one alternative or any combination of two or more freely selected alternatives when the number of alternatives is three or more.

Supplementary Description

Hereinafter, technical concepts and effects thereof that are understood from the above-described embodiments and modified examples will be described.

(A) The recording device is the recording device that can accommodate the recording unit including the recording portion for performing recording on a medium, and the loading portion on which a medium is loaded after recording is performed on the medium by the recording portion, and includes the housing that can accommodate the recording unit, the housing includes the extraction portion that demarcates the extraction area from which a medium loaded on the loading portion is removable, and the extraction area is the area in which a medium loaded on the loading portion is removable from downstream in the discharge direction in which a medium on which recording is performed by the recording portion is discharged. That is, the device that can accommodate the recording unit including the recording portion for performing recording on a medium, and the loading portion on which a medium is loaded after recording is performed on the medium by the recording portion includes the housing that can accommodate the recording unit, the housing includes the extraction portion that demarcates the extraction area from which a medium loaded on the loading portion is removable, and the extraction area is the area in which a medium loaded on the loading portion is removable from downstream in the discharge direction in which a medium on which recording is performed by the recording portion is discharged.

According to this configuration, even in the configuration in which the housing that accommodates the recording unit is provided, a medium loaded on the loading portion of the recording unit is removable from downstream in the discharge direction, by the extraction portion that demarcates the extraction area being provided. For this reason, as compared to a configuration in which a medium after recording drops from a recording unit to a extraction portion, it is possible to improve an alignment property of the medium after recording.

(B) In the device, the extraction portion may include an upper inner wall surface that defines an upper end of the extraction area, and the upper inner wall surface may be a surface that is higher at a second position than at a first position where the second position is further in the discharge direction than the first position.

According to this configuration, the upper inner wall surface defining the upper end of the extraction area widens toward the upper side at the second position in the discharge direction of the first position, as compared to the first position. Therefore, when a medium after recording is extracted from the extraction area, it becomes easy to insert a hand. This improves operability.

(C) In the device, the housing may include an installation area in which a configuration related to the device can be installed between the housing and the recording unit on an upper side of the extraction area. According to this configuration, the configuration related to the recording device can be installed between the housing and the recording unit on the upper side of the extraction area. Accordingly, an increase in size of the recording device can be suppressed.

(D) The recording device may include the recording unit. That is, the recording device may include the device and the recording unit. According to this configuration, the same effect as in (A) can be obtained. In addition, it is possible to configure the recording device using the recording unit including a loading portion. Therefore, in the recording unit, it is possible to enhance versatility of discharging of a medium after recording.

(E) In the recording device, the extraction area may overlap a part or all of the loading portion when viewed from a vertical direction intersecting the discharge direction.

According to this configuration, it is possible to bring the loading portion and the extraction area close to each other, and it is easy to extract a medium loaded on the loading portion. This improves operability. In addition, it is possible to bring the recording unit and the extraction area close to each other, and it is possible to suppress an increase in size of the recording device.

(F) In the recording device, the recording portion may perform recording on a medium while reciprocating in a width direction intersecting the discharge direction, the extraction portion may include an upper inner wall surface that defines an upper end of the extraction area, and the upper inner wall surface may overlap a part or all of a movement area of the recording portion when viewed from the discharge direction.

According to this configuration, the upper inner wall surface is provided so as to overlap a part or all of the movement area of the recording portion when viewed from the discharge direction. Therefore, it is possible to bring the movement area of the recording portion and the upper inner wall surface close to each other. Accordingly, an increase in size of the recording device can be suppressed.

(G) In the recording device, the recording portion may perform recording by discharging liquid onto a medium, the recording unit may include a waste liquid storage portion capable of storing liquid discharged as a waste liquid from the recording portion, the extraction portion may include an upper inner wall surface that defines an upper end of the extraction area, and the upper inner wall surface may overlap a part or all of the waste liquid storage portion when viewed from the discharge direction.

According to this configuration, the upper inner wall surface is provided so as to overlap a part or all of the waste liquid storage portion when viewed from the discharge direction. Therefore, the waste liquid storage portion and the upper inner wall surface can be brought close to each other. Accordingly, an increase in size of the recording device can be suppressed.

(H) In the recording device, the recording unit may include a discharge unit that discharges a medium on which recording is performed by the recording portion in the discharge direction, and the extraction area may overlap a part or all of the discharge unit when viewed from the discharge direction.

According to this configuration, the extraction area is provided so as to overlap a part or all of the discharge unit when viewed from the discharge direction. Therefore, a discharge position of a medium after recording and the extraction area can be brought close to each other. Accordingly, an increase in size of the recording device can be suppressed.

(I) In the recording device, the recording portion may perform recording on a medium while reciprocating in a width direction intersecting the discharge direction, and the extraction area may overlap a part or all of a movement area of the recording portion when viewed from the discharge direction.

According to this configuration, the extraction area is provided so as to overlap a part or all of the movement area of the recording portion when viewed from the discharge direction. For this reason, it is possible to bring the movement area of the recording portion and the extraction area close to each other. Accordingly, an increase in size of the recording device can be suppressed.

(J) In the recording device, the recording unit may include a unit housing that accommodates at least a part of the loading portion and the recording portion, a unit front face facing the discharge direction, and a discharge port for discharging a medium, the discharge port may be provided at the unit front face, and the extraction area may overlap a part or all of the discharge port when viewed from the discharge direction.

According to this configuration, the extraction area is provided so as to overlap a part or all of the discharge unit when viewed from the discharge direction. Therefore, a discharge position of a medium after recording and the extraction area can be brought close to each other. Accordingly, an increase in size of the recording device can be suppressed.

(K) In the recording device, the extraction area may include, upstream thereof in the discharge direction, a communication port that communicates with the discharge port, and the communication port may include the discharge port when viewed from the discharge direction.

According to this configuration, the communication port is provided so as to include the discharge port when viewed from the discharge direction. Therefore, by causing the discharge port and the extraction area to communicate with each other via the communication port, it becomes easy to extract a medium loaded on the loading portion. This improves operability.

(L) In the recording device, the recording unit may include an opening/closing cover capable of opening and closing the discharge port, and the extraction area may overlap a part or all of the opening/closing cover in a state where the opening/closing cover exposes the discharge port when viewed from a vertical direction intersecting the discharge direction.

According to this configuration, the extraction area is provided so as to overlap a part or all of the opening/closing cover with the discharge port opened when viewed from the vertical direction. Therefore, the opening/closing cover and the extraction area can be brought close to each other. Accordingly, an increase in size of the recording device can be suppressed.

(M) In the recording device, the loading portion may include a loading surface on which a medium is loadable after recording is performed on the medium by the recording portion, and the opening/closing cover may constitute a part or all of the loading surface with the discharge port opened.

According to this configuration, it is possible to bring the opening/closing cover and the extraction area close to each other, and it is easy to extract a medium loaded on the opening/closing cover. This improves operability.

(N) In the recording device, the loading portion may be inclined upward toward the discharge direction with the opening/closing cover exposing the discharge port.

According to this configuration, it is possible to prevent a medium after recording from jumping out from the loading portion. Therefore, an alignment property of a medium after recording can be improved.

(O) In the recording device, the recording unit may include a unit housing that accommodates at least a part of the loading portion and the recording portion, and a medium accommodation portion that accommodates a medium, and the extraction area may overlap a part or all of the medium accommodation portion when viewed from the discharge direction.

According to this configuration, the extraction area is provided so as to overlap a part or all of the medium accommodation portion when viewed from the discharge direction. For this reason, it is possible to bring the recording unit and the extraction area close to each other, and it is possible to suppress an increase in size of the recording device.

(P) In the recording device, the recording unit may include a unit front face facing the discharge direction, and a discharge port for discharging a medium, the discharge port may be provided at the unit front face, the extraction area may include, upstream thereof in the discharge direction, a communication port that communicates with the discharge port, and the communication port may overlap a part or all of the medium accommodation portion when viewed from the discharge direction.

According to this configuration, the communication port is provided so as to overlap a part or all of the medium accommodation portion when viewed from the discharge direction. For this reason, it is possible to bring the recording unit and the communication port close to each other, and it is possible to suppress an increase in size of the recording device.

(Q) In the recording device, the recording unit may include a unit housing that accommodates at least a part of the loading portion and the recording portion, and a medium accommodation portion that accommodates a medium, the medium accommodation portion may include an accommodation portion that accommodates a medium before recording to be transported to the recording portion, and the loading portion, and the extraction area may overlap a part or all of the accommodation portion when viewed from the discharge direction, and may overlap a part or all of the loading portion when viewed from the discharge direction.

According to this configuration, since the medium accommodation portion including both the accommodation portion and the loading portion, it is possible to accommodate both a medium before recording and a medium after recording. In addition, even in the recording unit including such a medium accommodation portion, the extraction area is provided so as to overlap a part or all of the accommodation portion when viewed from the discharge direction, and to overlap a part or all of the loading portion when viewed from the discharge direction. For this reason, it is possible to bring the recording unit and the extraction area close to each other, and it is possible to suppress an increase in size of the recording device.

(R) In the recording device, the recording unit may include a unit front face facing the discharge direction, and a discharge port for discharging a medium, the discharge port may be provided at the unit front face, the extraction area may include, upstream thereof in the discharge direction, a communication port that communicates with the discharge port, and the communication port may overlap a part or all of the accommodation portion when viewed from the discharge direction, and overlap a part or all of the loading portion when viewed from the discharge direction.

According to this configuration, the communication port is provided so as to overlap a part or all of the accommodation portion when viewed from the discharge direction, and to overlap a part or all of the loading portion when viewed from the discharge direction. For this reason, it is possible to bring the recording unit and the communication port close to each other, and it is possible to suppress an increase in size of the recording device.

(S) In the recording device, the recording unit may include a unit main body at which at least the recording portion and the loading portion are mounted, and a unit housing that accommodates the unit main body, and the unit main body may be displaceable with respect to the unit housing.

According to this configuration, by displacing the unit main body with respect to the unit housing, it is possible to facilitate handling of the recording portion and the loading portion mounted at the unit main body. This improves operability.

What is claimed is:

1. A device configured to accommodate a recording unit, the recording unit including a recording portion for performing recording on a medium, and a loading portion on which a medium is loaded after recording is performed on the medium by the recording portion, and a first housing that accommodates at least a part of the loading portion and the recording portion, the device comprising a second housing configured to accommodate the recording unit, wherein the second housing accommodates the first housing, the second housing includes an extraction portion that demarcates an extraction area from which a medium loaded on the loading portion is removable, the extraction area is an area from which a medium loaded on the loading portion is removable from downstream in a discharge direction in which a medium on which recording is performed by the recording portion is discharged, the extraction portion includes an upper inner wall surface that defines an upper end of the extraction area, the extraction area defining a cavity that extends from a front wall surface of the recording unit to the second housing and from the upper inner wall surface to a bottom surface of the second housing, and at least a portion of the loading portion that extends from the front wall surface of the recording unit being located in the extraction area.

2. The device according to claim 1, wherein the upper inner wall surface is a surface that is higher at a second position than at a first position, the second position being further in the discharge direction than the first position.

3. The device according to claim 1, wherein the first housing includes, on an upper side of the extraction area, an installation area in which a structure related to the device is installable between the housing and the recording unit.

4. A recording device, comprising:

the device according to claim 1; and the recording unit.

5. The recording device according to claim 4, wherein the extraction area overlaps a part or all of the loading portion when viewed from a vertical direction intersecting the discharge direction.

6. The recording device according to claim 4, wherein the recording portion performs recording on a medium while reciprocating in a width direction intersecting the discharge direction, the upper inner wall surface overlaps a part or all of a movement area of the recording portion when viewed from the discharge direction.

7. The recording device according to claim 4, wherein the recording portion performs recording by discharging liquid onto a medium, the recording unit includes a waste liquid storage portion configured to store liquid discharged as a waste liquid from the recording portion, and the upper inner wall surface overlaps a part or all of the waste liquid storage portion when viewed from the discharge direction.

8. The recording device according to claim 4, wherein the recording unit includes a discharge unit that discharges a medium on which recording is performed by the recording portion in the discharge direction, and the extraction area overlaps a part or all of the discharge unit when viewed from the discharge direction.

9. The recording device according to claim 4, wherein the recording portion performs recording on a medium while reciprocating in a width direction intersecting the discharge direction, and the extraction area overlaps a part or all of a movement area of the recording portion when viewed from the discharge direction.

10. The recording device according to claim 4, wherein the recording unit includes a unit front face facing the discharge direction, and a discharge port for discharging a medium, the discharge port is provided at the unit front face, and the extraction area overlaps a part or all of the discharge port when viewed from the discharge direction.

11. The recording device according to claim 10, wherein the extraction area includes, upstream thereof in the discharge direction, a communication port that communicates with the discharge port, and the communication port includes the discharge port when viewed from the discharge direction.

12. The recording device according to claim 4, wherein the recording unit includes a unit front face facing the discharge direction, and a discharge port for discharging a medium, and an opening/closing cover configured to open and close the discharge port, the discharge port is provided at the unit front face, and the extraction area overlaps a part or all of the opening/closing cover in a state where the opening/closing cover exposes the discharge port, when viewed from a vertical direction intersecting the discharge direction.

13. The recording device according to claim 12, wherein the loading portion includes a loading surface on which a medium is loadable after recording is performed on the medium by the recording portion, and the opening/closing cover constitutes a part or all of the loading surface with the discharge port opened.

14. A device configured to accommodate a recording unit, the recording unit including a recording portion for performing recording on a medium, and a loading portion on which a medium is loaded after recording is performed on the medium by the recording portion, and a first housing that accommodates at least a part of the loading portion and the recording portion, the device comprising a second housing configured to accommodate the recording unit, wherein the second housing accommodates the first housing, the second housing includes an extraction portion that demarcates an extraction area from which a medium loaded on the loading portion is removable, the extraction area is an area from which a medium loaded on the loading portion is removable from downstream in a discharge direction in which a medium on which recording is performed by the recording portion is discharged, the loading portion is configured to be rotatable about a rotary shaft extending in the width direction of the medium, and the second housing supports the loading portion.

15. The recording device according to claim 4, wherein the recording unit includes a medium accommodation portion that accommodates a medium, and the extraction area overlaps a part or all of the medium accommodation portion when viewed from the discharge direction.

16. The recording device according to claim 15, wherein the recording unit includes a unit front face facing the discharge direction, and a discharge port for discharging a medium, the discharge port is provided at the unit front face, the extraction area includes, upstream thereof in the discharge direction, a communication port that communicates with the discharge port, and the communication port overlaps a part or all of the medium accommodation portion when viewed from the discharge direction.

17. The recording device according to claim 4, wherein the recording unit includes a medium accommodation portion that accommodates a medium, the medium accommodation portion includes an accommodation portion that accommodates a medium before recording to be transported to the recording portion, and the loading portion, and the extraction area overlaps a part or all of the accommodation portion when viewed from the discharge direction, and overlaps a part or all of the loading portion when viewed from the discharge direction.

18. The recording device according to claim 17, wherein the recording unit includes a unit front face facing the discharge direction, and a discharge port for discharging a medium, the discharge port is provided at the unit front face, the extraction area includes, upstream thereof in the discharge direction, a communication port that communicates with the discharge port, and the communication port overlaps a part or all of the accommodation portion when viewed from the discharge direction, and overlaps a part or all of the loading portion when viewed from the discharge direction.

19. The recording device according to claim 14, wherein the loading portion is supported by the second housing so as to be inclined upward toward the discharge direction with an opening/closing cover exposing a discharge port.

20. A device configured to accommodate a recording unit, the recording unit including a recording portion for performing recording on a medium, and a loading portion on which a medium is loaded after recording is performed on the medium by the recording portion, and a first housing that accommodates at least a part of the loading portion and the recording portion, the device comprising a second housing configured to accommodate the recording unit, wherein the second housing accommodates the first housing, the second housing includes an extraction portion that demarcates an extraction area from which a medium loaded on the loading portion is removable, the extraction area is an area from which a medium loaded on the loading portion is removable from downstream in a discharge direction in which a medium on which recording is performed by the recording portion is discharged, the extraction portion includes an upper inner wall surface that demarcates an upper end of the extraction area, and and the upper inner wall surface extends upward toward a front face of the second housing from a front face of the recording unit.

* * * * *